United States Patent Office
3,052,690
Patented Sept. 4, 1962

1

3,052,690
NEW TETRACYCLIC AZEPINE DERIVATIVES
Walter Schindler, Riehen, near Basel, Switzerland, assignor to Geigy Chemical Corporation, Ardsley, N.Y., a corporation of Delaware
No Drawing. Filed Mar. 28, 1960, Ser. No. 17,780
Claims priority, application Switzerland Mar. 26, 1959
6 Claims. (Cl. 260—325)

The present invention concerns new tetracyclic azepine derivatives having valuable pharmacological properties and also a process for the production of these compounds. It also concerns a process for the production of starting materials which are used in the first process mentioned above.

5-(α-halogenacyl)-iminodibenzyl derivatives of the general formula

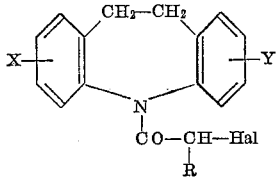

I wherein

X represents hydrogen, a halogen atom or a low molecular alkyl radical,
Y represents hydrogen, a halogen atom or a low molecular alkyl radical, and X and Y can be different from each other but when they are the same they are advantageously in the same relative position to the NH group,
R represents hydrogen or a low molecular alkyl radical, and
Hal represents bromine or chlorine, can be converted by treatment with a Friedel-Crafts condensing agent, in particular aluminium chloride, into 1 - oxo - 1.2.6.7 - tetrahydro-indolo[1.7a.7-a.b] benzo[f] azepines of the general formula

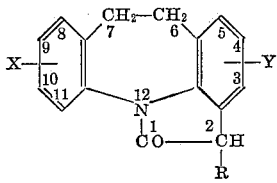

II which compounds are important new starting materials for the synthesis of valuable pharmaceuticals.

It has surprisingly been found that 1-oxo-2-tert. aminoalkyl - 1.2.6.7 - tetrahydro-indolo[1.7a.7 - a.b]benzo[f] azepines of the general formula

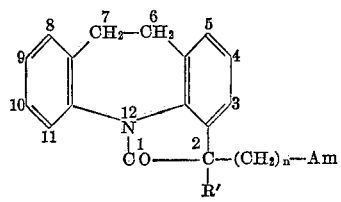

III wherein

R' represents a low molecular alkyl radical,

2

Am represents a low molecular dialkylamino group the alkyl radicals of which can also be bound to each other direct, and
n represents a whole number of 1 to 3, which are produced from such starting materials, have valuable pharmacological properties, in particular antiallergic and spasmolytic activity with, at the same time, a very slight sedative side effect, and are suitable for the peroral and parenteral treatment of mental disorders and allergy.

The new azepine derivatives of the general Formula III are produced by condensing a compound of the general Formula II in which X and Y are hydrogen atoms and R is a low molecular alkyl radical, either with formaldehyde and bases of the general formula Am—H    IV wherein Am has the meaning given above, or by condensing compounds of the general Formula II as mentioned above, in the preesnce of acid binding agents, with reactive esters of basic alcohols of the general formula HO—(CH$_2$)$_m$—Am    V wherein Am has the meaning given above and m is 2 or 3.

That the starting materials of the general Formula II are formed from the compounds of the general Formula I by reaction according to Friedel-Crafts is all the more surprising as the analogous ring closure in other tricyclic N-hetero compounds such as carbazole, dihydroacridine and phenthiazine is not known.

The treatment of compounds of the general Formula I with a Friedel-Crafts condensing agent can be performed, for example, by mixing these compounds with such a condensing agent, in particular, with aluminium chloride, and heating the mixture to temperatures of between 120–200° C. until the hydrogen halide development ceases. Suitable compounds of the general Formula I are, for example, 5-chloroacetyl, 5-bromoacetyl, 5-(α-chloropropionyl)-, 5-(α-bromopropionyl)-, 5-(α-bromobutyryl)-, 5-(α-bromovaleryl)-, 5-(α-bromoisovaleryl)- and 5-(α-bromocaproyl)- iminodibenzyl, -3-chloroiminodibenzyl, -3-bromoiminodibenzyl, -3-ethyliminodibenzyl, -3.7 - dichloroiminodibenzyl and -3.7 - dimethyliminodibenzyl.

The condensation according to the invention of the starting materials of the general Formula II obtained in this manner, in which X and Y are hydrogen atoms and R is a low molecular alkyl radical, with formaldehyde and an amine of the general Formula IV is performed advantageously in an aqueous organic solvent, e.g. in dioxan, using aqueous formaldehyde solution and acetic acid. The reaction frequently occurs even at room temperature or then at a moderately raised temperature. Examples of amines of the general Formula IV are dimethylamine, diethylamine, di-n-propylamine, di-n-butylamine, di-isobutylamine, methyl-n-butylamine, pyrrolidine and piperidine.

The condensation of 1-oxo-1.2.6.7-tetrahydroindolo-[1.7a.7-a.b.]benzo[f]azepines of the general Formula II with reactive esters of basic alcohols of the general Formula V is performed advantageously in the presence of those acid binding agents which are capable of replacing a hydrogen atom of the reactive methylene group by a metal atom. Examples of such agents are sodium amide, lithium amide and potassium amide as well as lithium, sodium and potassium and alcoholates thereof. As inert organic solvent, in particular, a benzene hydrocarbon such as benzene, toluene or xylene can serve as reaction medium and the reaction can be performed, for example at the boiling temperature thereof.

Suitable reactive esters of amino alcohols of the general Formula V are, in particular, the halides, also for example, aryl sulphonic acid esters and salts of acid esters of sulphuric acid. Examples of suitable halides are:

Dimethylaminoethyl chloride, diethylaminoethyl chloride, methylethylaminoethyl chloride, β-dimethylaminopropyl chloride, β-dimethylaminoisopropyl chloride, γ-dimethylaminopropyl chloride, β-(di-n-propylamino)-ethyl chloride, β-(methylisopropylamino)-ethyl chloride, β-(di-n-butylamino)-ethyl chloride, β-di-isobutylamino)-ethyl chloride, pyrrolidino-ethyl chloride, piperidino-ethyl chloride and γ-piperidino-propyl chloride as well as the corresponding bromides and iodides.

The tertiary bases of the general Formula III form salts, some of which are water soluble, with inorganic or organic acids such as hydrochloric acid, hydrochromic acid, sulphuric acid, phosphoric acid, methane sulphonic acid, ethane disulphonic acid, acetic acid, citric acid, malic acid, succinic acid, fumaric acid, maleic acid, tartaric acid, benzoic acid and phthalic acid.

The following examples further illustrate the production of the new compounds. Parts are given therein as parts by weight and their relationship to parts by volume is as that of grammes to cubic centimetres. The temperatures are in degrees centigrade.

*Example 1.—(Production of the starting material):*

(a) 98 parts of iminodibenzyl are dissolved in 300 parts by volume of benzene and 116 parts of α-bromobutyric acid bromide are added. The mixture is refluxed for 5 hours and then the solvent is distilled off in the vacuum. The remaining 5'-(α-bromobutyryl)-iminodibenzyl crystallises from ether, M.P. 100°. In an analogous manner on using 108 parts of α-bromopropionic acid bromide, 5-(α-bromopropionyl)-iminodibenzyl is obtained, M.P. 118–119°.

(b) 40 parts of the above bromine compound and 40 parts of aluminium chloride are well mixed and heated in an oil bath at 160°. On completion of the exothermic reaction, the reaction mixture is cooled and poured onto ice and a little hydrochloric acid. The reaction product is taken up in ether, the aqueous phase is thoroughly extracted with ether, the combined ether solutions are washed with water and concentrated. The residue crystallises from a little ether. 1-oxo-2-ethyl-1.2.6.7-tetrahydro-indolo[1.7a.7-a.b]benzo[f]azepine is obtained which melts at 108°. 1-oxo-2-methyl-1.2.6.7-tetrahydro-indolo[1.7a.7-a.b.]benzo[f]azepine (M.P. 108–109°) and 1-oxo-1.2.6.7-tetrahydro-indolo[1.7a.7-a.b]benzo[f]azepine (M.P. 198°) are obtained in an analogous manner.

*Example 2*

20 parts of the 2-ethyl compound obtained according to Example 1b are dissolved in 90 parts by volume of dioxan and the solution is added dropwise at 0–5° to 51 parts by volume of glacial acetic acid, 11 parts by volume of formaldehyde and 14 parts by volume of 40% aqueous dimethylamine in 90 parts by volume of dioxan. The solution is stirred for 16 hours at room temperature, then poured into excess water and is washed with ether. The aqueous phase is then made alkaline with concentrated ammonia solution, the precipitated oil is taken up in ether and the ether solution is dried and concentrated. On adding alcoholic hydrochloric acid to the remaining oil, the hydrochloride of 1-oxo-2-ethyl-2-dimethylaminomethyl-1.2.6.7-tetrahydro-indolo[1.7a.7-a.b]benzo[f]azepine is obtained. M.P. 228–230°.

On using the corresponding starting materials: 1-oxo-2-ethyl-2-pyrrolidinomethyl-1.2.6.7-tetrahydro-indolo[1.7a.7-a.b]benzo[f]azepine hydrochloride, M.P. 197–198°; 1-oxo-2-methyl-2-dimethylaminomethyl-1.2.6.7-tetrahydro-indolo[1.7a.7-a.b]benzo[f]azepine hydrochloride, M.P. 228–230°; and 1-oxo-2-methyl-2-diethylaminomethyl-1.2.6.7-tetrahydro-indolo[1.7a.7-a.b]benzo[f]apezine hydrochloride, M.P. 240°, are obtained in an analogous manner.

*Example 3*

15 parts of 1-oxo-2-ethyl-1.2.6.7-tetrahydro-indolo[1.7a.7-a.b]benzo[f]azepine (see Example 1b) and the base liberated from 12 parts of dimethylaminoethyl chloride-hydrochloride are stirred in benzene at 55–60° and a suspension of 3 parts of sodium amide in toluene is added dropwise. After the dropwise addition, the whole is stirred for 1 hour at 60° and is then refluxed for 16 hours. The reaction mixture is then cooled, decomposed with water and the basic parts are removed by extraction with diluted hydrochloric acid. The acid extracts are made alkaline and extracted with ether. On adding alcoholic hydrochloric acid to the ethereal solution of the base, the hydrochloride of 1-oxo-2-ethyl-2-dimethylaminoethyl-1.2.6.7-tetrahydro-indolo[1.7a.7-a.b]benzo[f]azepine precipitates; M.P. 248–253°.

1-oxo-2-methyl-2-(γ-dimethylaminopropyl)-1.2.6.7-tetrahydro-indolo[1.7a.7-a.b]benzo[f]azepine hydrochloride is obtained in an analogous manner. M.P. 210°.

What I claim is:

1. A compound of the formula

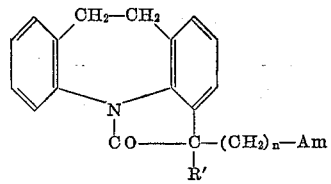

wherein R' represents lower alkyl, Am represents a member selected from the group consisting of lower dialkylamino and pyrrolidino, and $n$ represents an integer from 1 to 3.

2. A compound of the formula

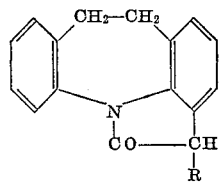

wherein R represents a member selected from the group consisting of hydrogen and lower alkyl.

3. The compound of the formula

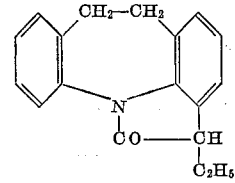

4. The compound of the formula

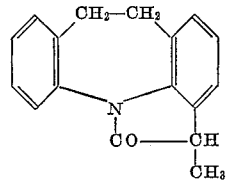

5. The compound of the formula

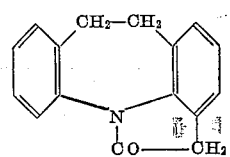

6. The compound of the formula
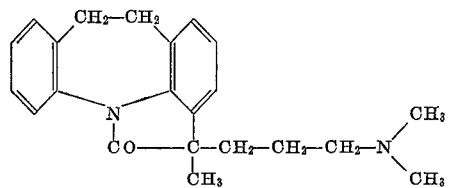
References Cited in the file of this patent
UNITED STATES PATENTS
| | | | |
|---|---|---|---|
| 2,841,591 | Prichard | | July 1, 1958 |
| 2,857,396 | Wheeler et al. | | Oct. 21, 1958 |
| 2,949,469 | Coker et al. | | Aug. 16, 1960 |
| 2,950,287 | Iwao et al. | | Aug. 23, 1960 |